US010996756B1

(12) United States Patent
Ahne et al.

(10) Patent No.: US 10,996,756 B1
(45) Date of Patent: May 4, 2021

(54) TACTILE INPUT MECHANISMS, ARTIFICIAL-REALITY SYSTEMS, AND RELATED METHODS

(71) Applicant: Facebook Technologies, LLC, Menlo Park, CA (US)

(72) Inventors: Adam Ahne, Snohomish, WA (US); Nicholas Roy Corson, Woodinville, WA (US); Andrew Arthur Stanley, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 55 days.

(21) Appl. No.: 16/427,376

(22) Filed: May 31, 2019

(51) Int. Cl.
*G06F 3/01* (2006.01)
*G06F 1/16* (2006.01)

(52) U.S. Cl.
CPC ............. *G06F 3/016* (2013.01); *G06F 1/163* (2013.01); *G06F 3/014* (2013.01)

(58) Field of Classification Search
CPC ........... G06F 3/016; G06F 3/014; G06F 1/163
See application file for complete search history.

(56) References Cited

U.S. PATENT DOCUMENTS

| 10,642,356 | B1* | 5/2020 | Wang | G06F 3/03547 |
| 2003/0004657 | A1* | 1/2003 | Allen | G06F 3/016 |
| | | | | 702/45 |
| 2014/0215684 | A1* | 8/2014 | Hardy | A41D 19/0031 |
| | | | | 2/160 |

* cited by examiner

*Primary Examiner* — Alexander Eisen
*Assistant Examiner* — Cory A Almeida
(74) *Attorney, Agent, or Firm* — FisherBroyles, LLP

(57) ABSTRACT

The disclosed tactile input mechanisms may include a bladder dimensioned to hold a fluid, a pressure sensor coupled to the bladder and configured to sense a pressure exerted against the bladder, and a fluidic valve coupled to the bladder and configured to vent the bladder in response to the sensed pressure reaching a predetermined threshold. Various other related systems and methods are also disclosed.

20 Claims, 14 Drawing Sheets

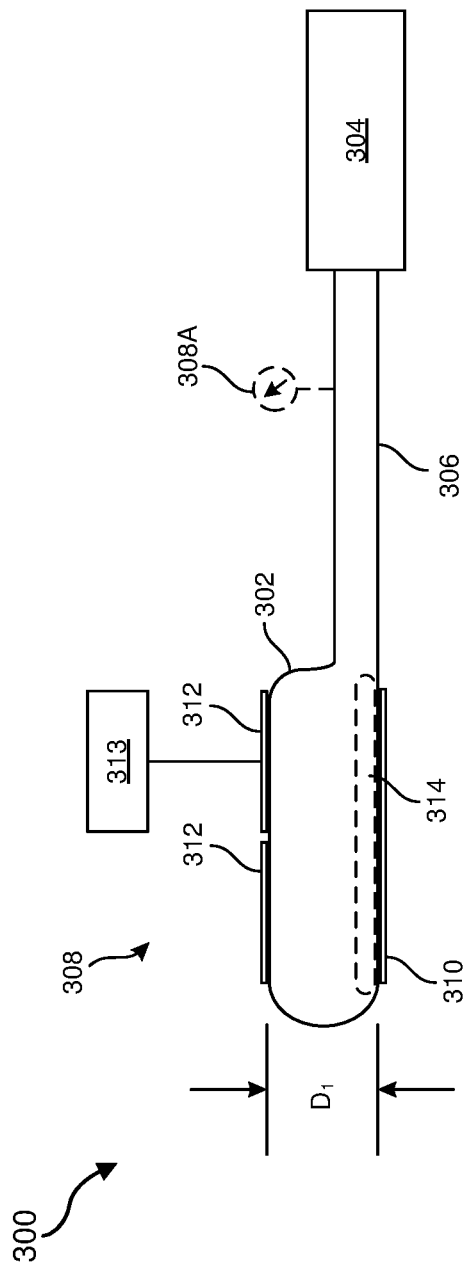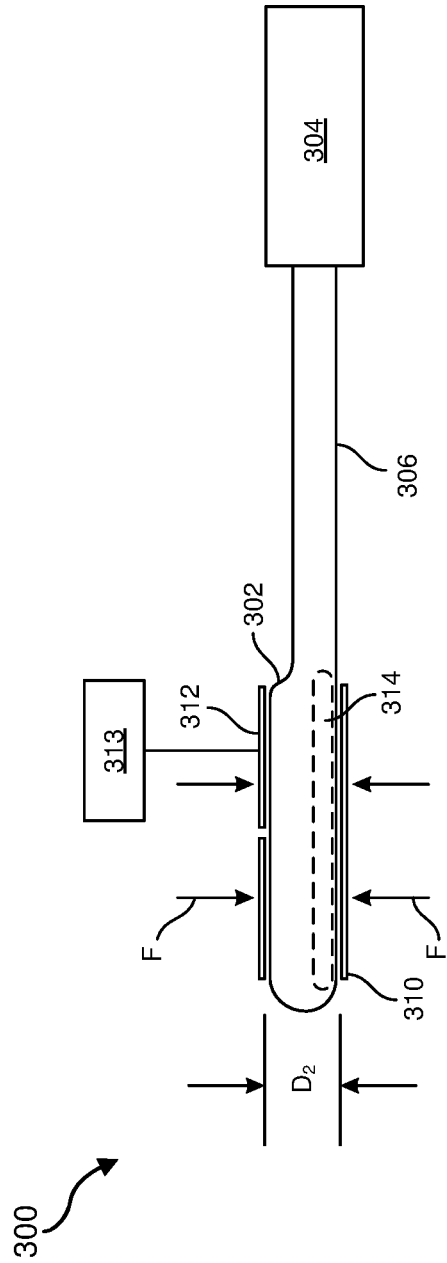
FIG. 3A
FIG. 3B

TACTILE INPUT MECHANISMS, ARTIFICIAL-REALITY SYSTEMS, AND RELATED METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

FIGS. 3A and 3B are cross-sectional side views of a tactile input mechanism respectively in expanded and contracted states, according to at least one embodiment of the present disclosure.

Figure 1:
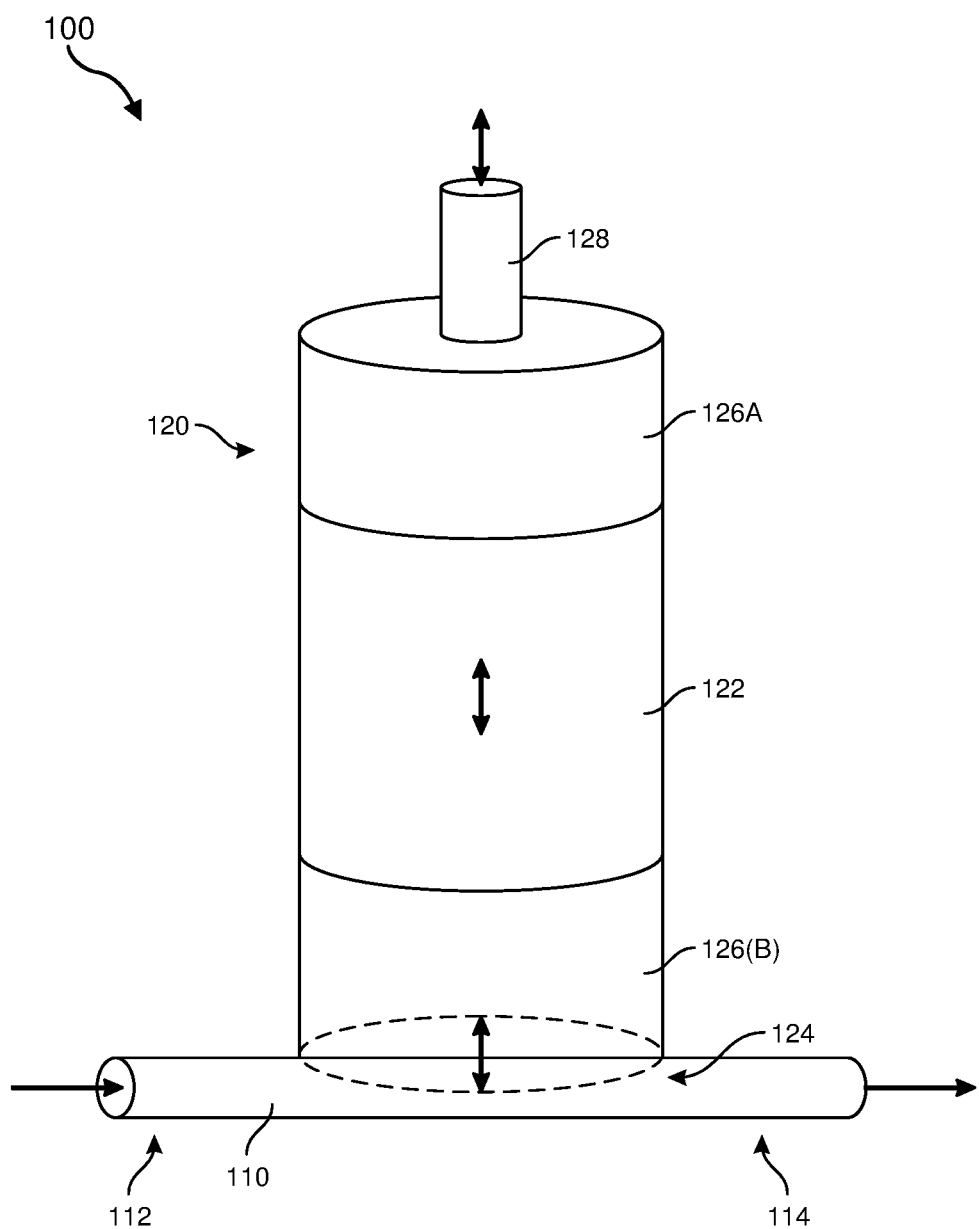
FIG. 1 is an illustration of an example fluidic control system that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. Artificial-reality systems may be used for a variety of purposes, such as for gaming, video conferencing, or other conventional computing activities (e.g., word processing, digital art generation, etc.). A user of an artificial-reality system may provide different input signals to the system, such as to interact with a virtual object.

For example, virtual keyboards may include a virtual representation of a keyboard with which the user may interact to type in an artificial-reality environment. Virtual keyboards may include an image of a keyboard projected on a physical surface. The user may press against the physical surface at locations of the keys of the projected keyboard in an attempt to input keystrokes with the virtual keyboard. However, there may be several technical challenges in implementing such virtual keyboards as input mechanisms for artificial-reality systems. For example, optical sensors may be employed to determine where (relative to the virtual keyboard) a user places his or her fingers for the typing action. However, it may be difficult or impossible for such optical sensors to determine with accuracy when the user intends to press against a virtual key compared to when the user simply hovers or rests a finger over the virtual key without intending to press against the key and perform a keystroke. By way of another example, repeatedly pressing fingers against a hard physical surface (e.g., a surface of a table) may induce discomfort in the user's fingertips. In addition, the user may not receive any tactile feedback that the intended keystroke was properly performed.

The present disclosure is generally directed to tactile input mechanisms with inflatable and collapsible bladders, which may be positioned on the fingertips of a glove or on another wearable device. As will be explained in further detail below, the tactile input mechanisms may be used for a variety of applications, such as in an artificial-reality system for interaction with a virtual object (e.g., a virtual keyboard, a virtual button, etc.). The bladders may be deflated when the virtual object is not in use and may be inflated to an operating pressure (e.g., 15 psi relative to atmosphere) when the virtual object is in use. In addition to the bladders, the tactile input mechanisms may also include pressure sensors that may be coupled to the respective bladders and may be configured to sense a pressure exerted against the bladders. The fluid in the bladders may be trapped by a valve until a user presses the bladders against a solid surface with sufficient pressure to meet or exceed a predetermined threshold. When the sensed pressure reaches the threshold, a fluidic valve may release the pressure within the bladder to vent and collapse the bladder. This collapsing action may provide a tactile sensation to the user, such as, for example, a sensation that a button or key on a keyboard is being pressed or a bubble is popping.

The mechanisms, systems, and methods of the present disclosure may provide the sensation of a tactile key of a standard keyboard and may be more comfortable than tapping directly on a hard surface. In addition, the bladders and pressure sensors may be used to determine when a user touches a physical object or surface or two fingers together with more certainty that with optical tracking alone. Moreover, in some examples, the threshold pressure at which the bladders collapse may be tailored, such as to suit user preferences or to provide different indications to the user (e.g., the pressure to press a larger virtual button may be higher than the pressure to press a smaller virtual button).

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
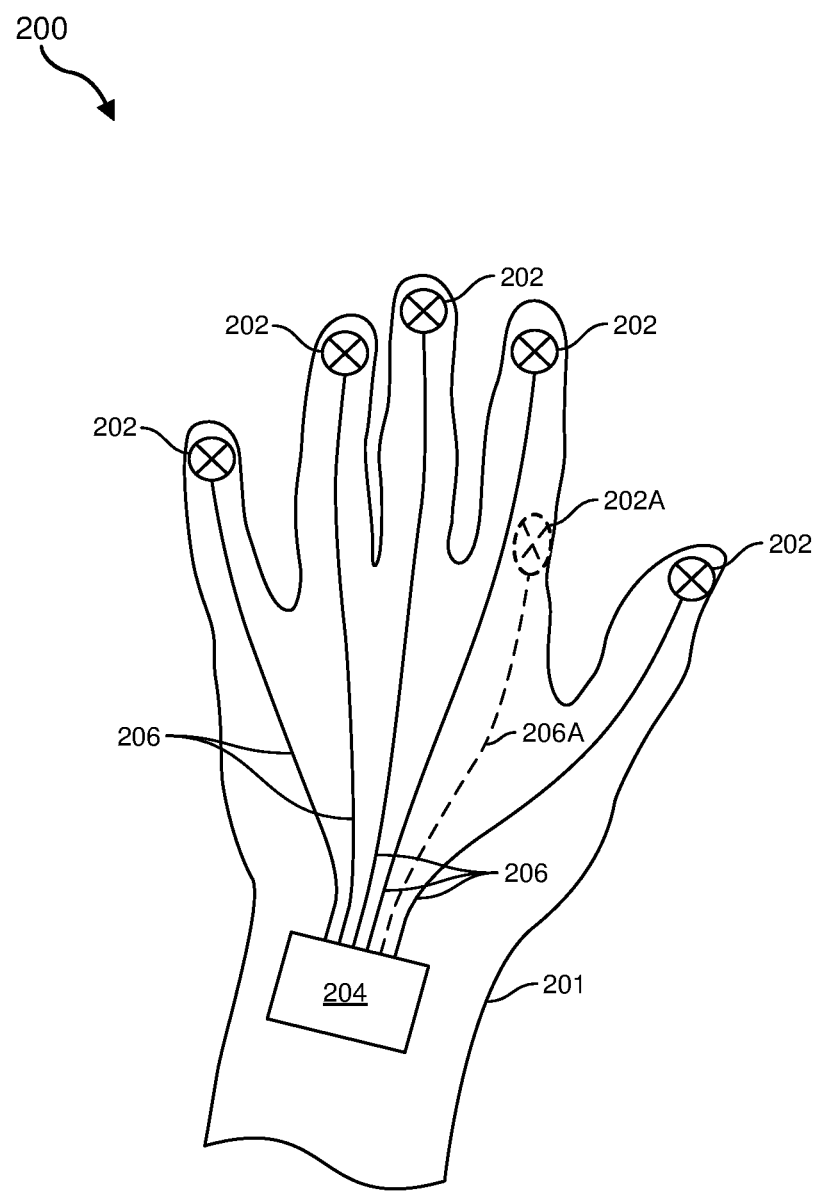
FIG. 2 is a perspective view of a wearable device in the form of a glove, according to at least one embodiment of the present disclosure.
Figure 4A:
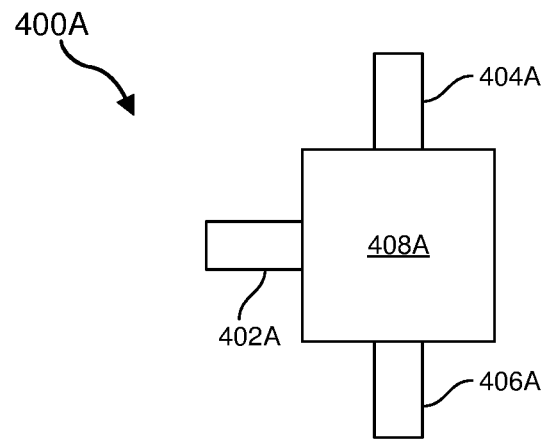
FIGS. 4A-4C are schematic views of respective valves that may be employed to inflate and/or deflate inflatable bladders of tactile input mechanisms, according to various embodiments of the present disclosure.
Figure 4B:
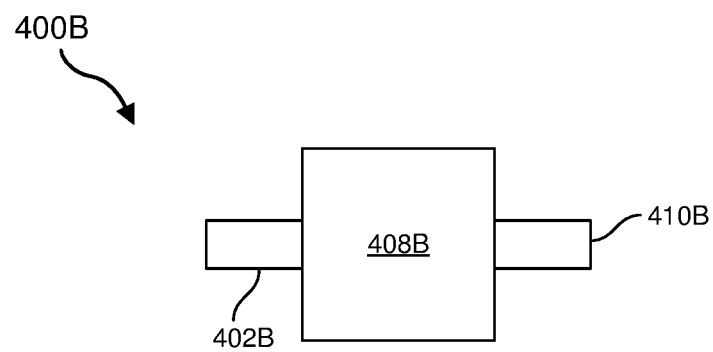
Figure 4C:
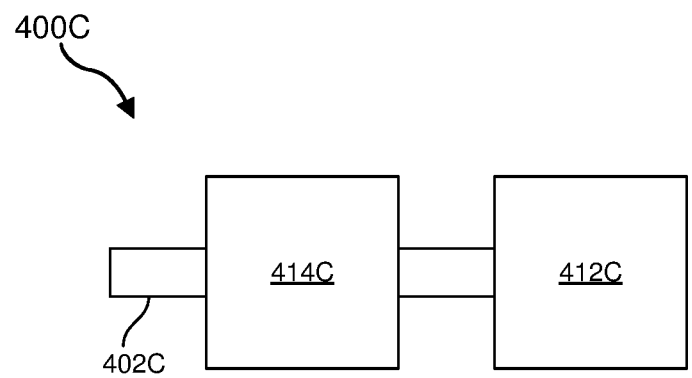
Figure 5:
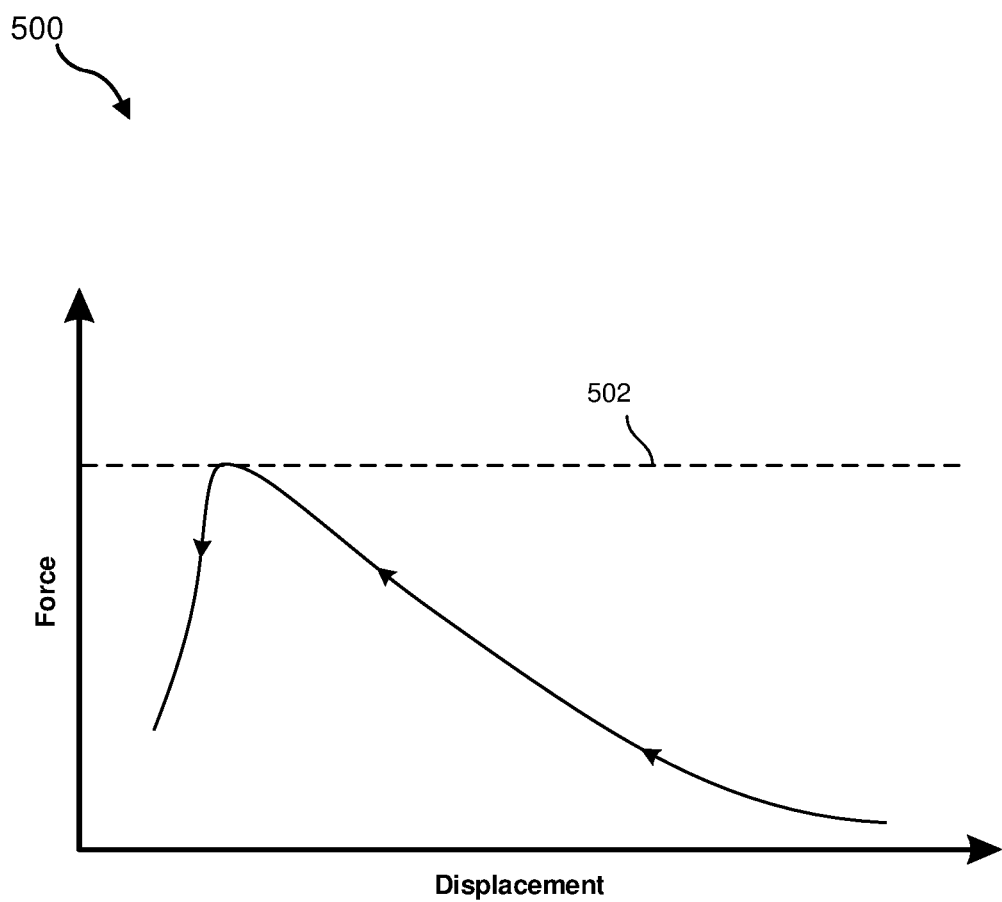
FIG. 5 is a graph illustrating an example relationship between displacement and force of a tactile input mechanism, according to at least one embodiment of the present disclosure.
Figure 6:
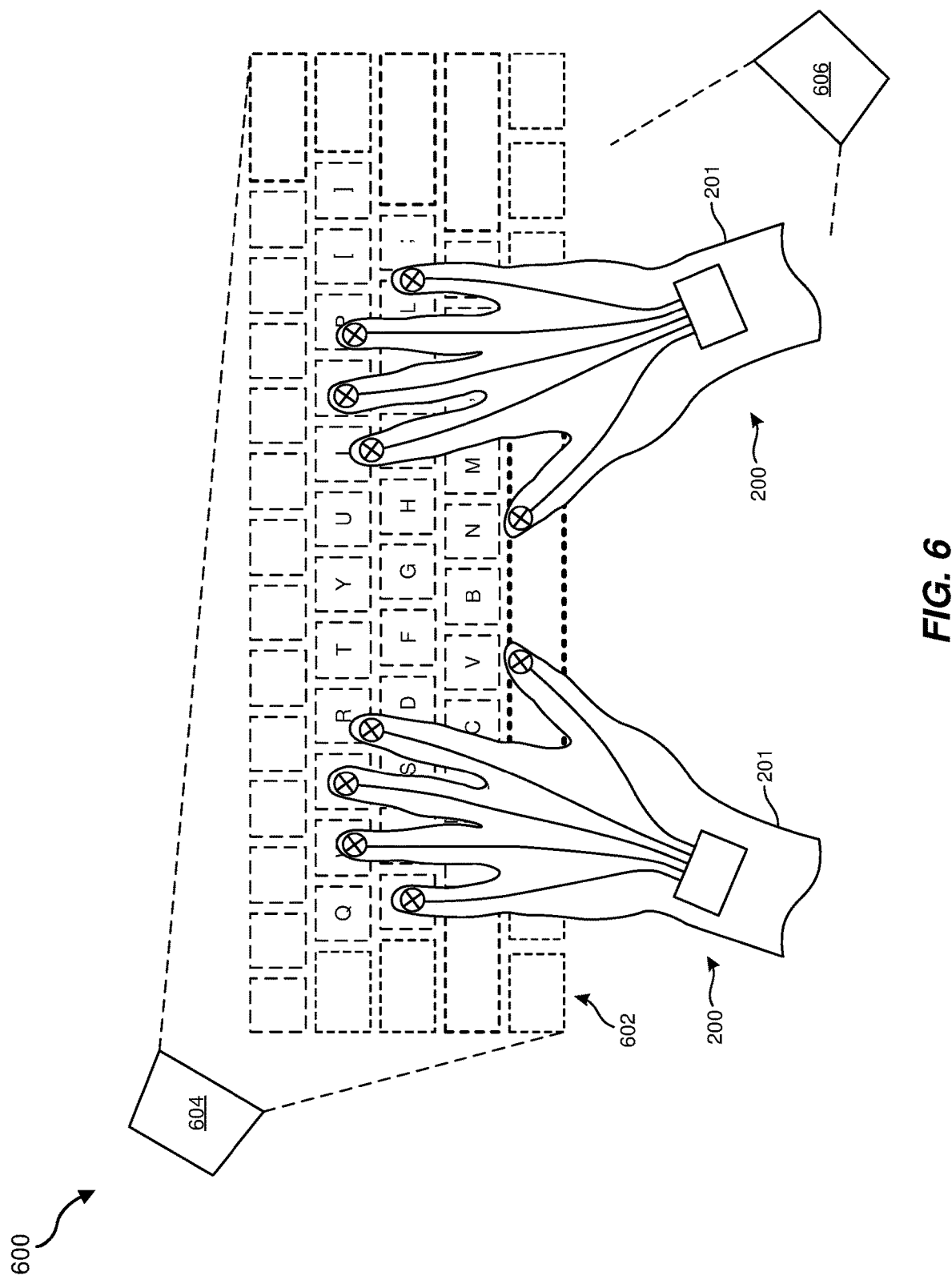
FIG. 6 is an overhead view of two wearable devices in use in an artificial-reality environment, according to at least one embodiment of the present disclosure.
Figure 7:
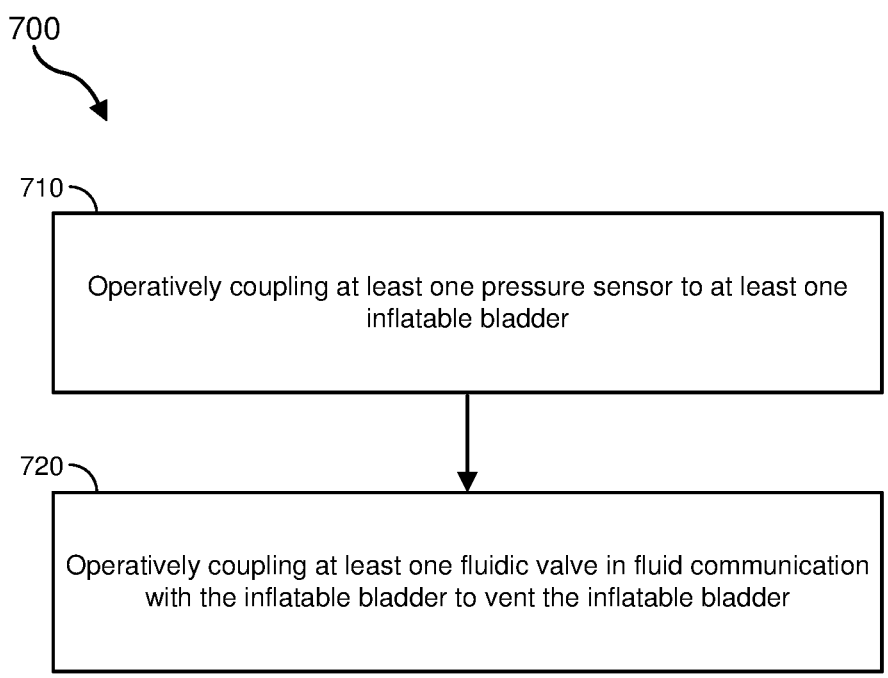
FIG. 7 is a flow diagram illustrating a method for forming a tactile input mechanism, according to at least one embodiment of the present disclosure.
Figure 8:
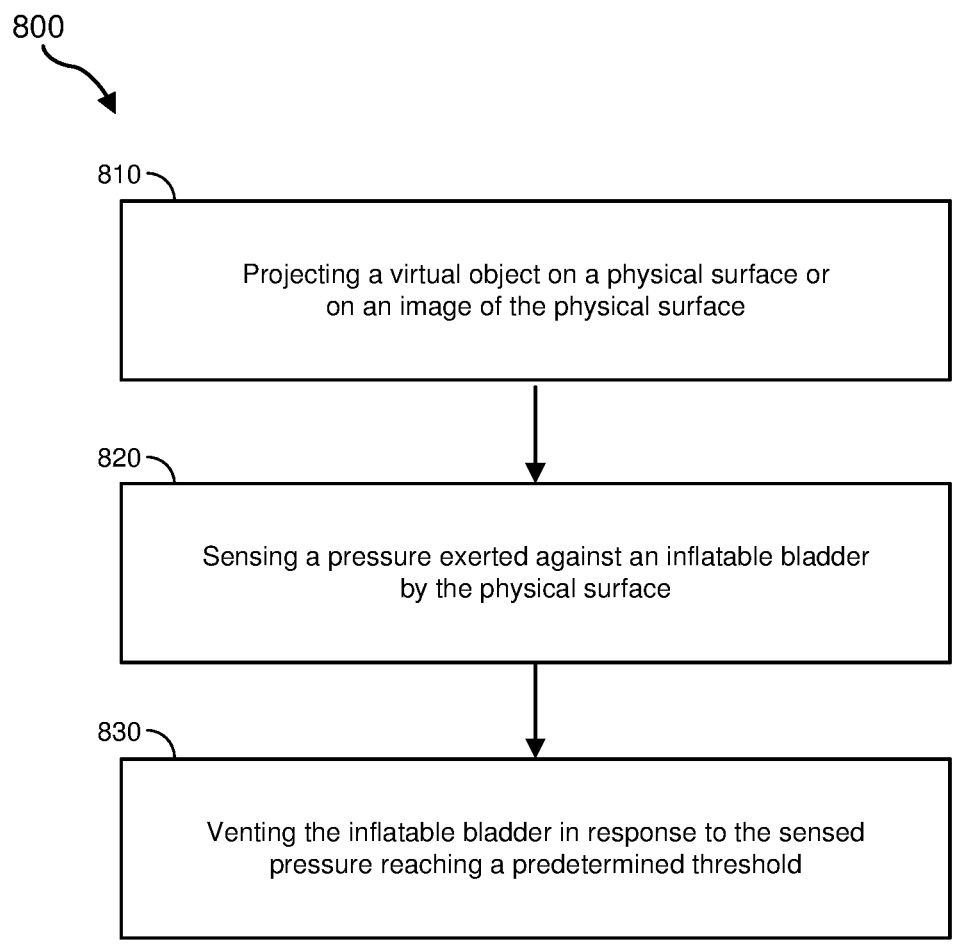
FIG. 8 is a flow diagram illustrating a method for using an artificial-reality system, according to at least one embodiment of the present disclosure.

The following will provide, with reference to FIG. 1, detailed descriptions of an example fluidic control system. With reference to FIG. 2, the following will provide detailed descriptions of an example wearable device in the form of a glove. With reference to FIGS. 3A and 3B, the following will provide detailed descriptions of an example tactile input mechanism. With reference to FIGS. 4A-4C, the following will provide detailed descriptions of various respective example fluidic valve assemblies, such as may be employed with the tactile input mechanisms of the present disclosure. With reference to FIG. 5, the following will provide detailed descriptions of a graph that illustrates an example relationship between displacement and force in a tactile input mechanism. With reference to FIG. 6, the following will provide detailed descriptions of wearable devices in use in an artificial-reality environment. With reference to FIGS. 7 and 8, detailed descriptions of methods for forming a tactile input mechanism and for using an artificial-reality system will be provided. With reference to FIGS. 9-14, the following will provide detailed descriptions of various artificial-reality systems and devices that may be used in conjunction with mechanisms, systems, and methods of the present disclosure.

The present disclosure may include haptic fluidic systems that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

The fluidic valve 100 may include a gate 120 for controlling the fluid flow through the fluid channel 110. The gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to the gate transmission element 122 may result in opening the restricting region 124 to allow or increase flow through the fluid channel 110. The force, pressure, or displacement applied to the gate transmission element 122 may be referred to as a gate force, gate pressure, or gate displacement. The gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, the gate 120 of the fluidic valve 100 may include one or more gate terminals, such as an input gate terminal 126A and an output gate terminal 126B (collectively referred to herein as "gate terminals 126") on opposing sides of the gate transmission element 122. The gate terminals 126 may be elements for applying a force (e.g., pressure) to the gate transmission element 122. By way of example, the gate terminals 126 may each be or include a fluid chamber adjacent to the gate transmission element 122. Alternatively or additionally, one or more of the gate terminals 126 may include a solid component, such as a lever, screw, or piston, that is configured to apply a force to the gate transmission element 122.

In some examples, a gate port 128 may be in fluid communication with the input gate terminal 126A for applying a positive or negative fluid pressure within the input gate terminal 126A. A control fluid source (e.g., a pressurized fluid source, a fluid pump, etc.) may be in fluid communication with the gate port 128 to selectively pressurize and/or depressurize the input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward the restricting region 124, resulting in a corresponding pressurization of the output gate terminal 126B. Pressurization of the output gate terminal 126B may, in turn, cause the restricting region 124 to partially or fully restrict to reduce or stop fluid flow through the fluid channel 110. Depressurization of the input gate terminal 126A may cause the gate transmission element 122 to be displaced away from the restricting region 124, resulting in a corresponding depressurization of the output gate terminal 126B. Depressurization of the output gate terminal 126B may, in turn, cause the restricting region 124 to partially or fully expand to allow or increase fluid flow through the fluid channel 110. Thus, the gate 120 of the fluidic valve 100 may be used to control fluid flow from the inlet port 112 to the outlet port 114 of the fluid channel 110.

FIG. 2 is a perspective view of a wearable device 200 in the form of a glove 201, according to one implementation of the present disclosure. As shown in FIG. 2, the wearable device 200 may include bladders 202 respectively positioned at fingertip portions of the glove 201, in locations to be pressed against a physical, real-world object by the user's fingers when the wearable device 200 is in use. A fluidic valve assembly 204 configured to inflate and/or deflate the bladders 202 may be coupled (e.g., fluidically coupled) to the bladders 202, such as via respective flexible conduits 206. As will be further explained below, the wearable device 200 may also include pressure sensors coupled to the respective bladders 202. The pressure sensors may be configured to sense a pressure exerted against the bladders 202, such as when the user presses against a physical object. The bladders 202, fluidic valve assembly 204, and conduits 206 may collectively form a tactile input mechanism.

The bladders 202 may be formed of a flexible material that is configured to contain a fluid. For example, the material of the bladders 202 may include a polymer material, such as an elastomeric material (e.g., synthetic or natural rubber, silicone, polyurethane, polyamide, polyolefin, etc.). In some examples, the material of the bladders 202 may be selected and tailored to provide a certain level of elasticity, which may result in a dampening effect when a user presses against the bladders 202. The fluid to be contained within the bladders 202 may include a gas (e.g., air, carbon dioxide, nitrogen, etc.) and/or a liquid (e.g., water, oil, etc.). In examples in which a compressible fluid (e.g., a gas) is employed, the compressibility of the fluid may also provide some additional dampening when a user presses against the bladders 202. In the case of an incompressible fluid (e.g., a liquid), the dampening may be provided primarily by the characteristics of the material used for the bladders. Thus, the response characteristics of (e.g., the "feel" of interacting with) the bladders 202 may be adjusted in part by selecting and/or tailoring the material of the bladders 202 and/or the fluid to be contained within the bladders.

Some Example

The fluidic valve assembly 204 may include any mechanism or valve configured to inflate the bladders 202 and/or to vent (e.g., at least partially deflate) the bladders 202. Some example fluidic valves that may be employed by the fluidic valve assembly 204 are described below with reference to FIGS. 4A-4C.

In some examples, the bladders 202 may be at least partially deflated when the wearable device 200 is not in use (e.g., when the tactile feedback provided by the bladders 202 is not needed), such as when the glove 201 is used in open space in an artificial-reality environment. Thus, the user may utilize the glove 201 without sensing pressure against the user's fingertips when the bladders 202 are deflated. When an activated mode is enabled (e.g., when the user is to interact with a virtual keyboard, button, or other virtual object by pressing against a physical object), the fluidic valve assembly 204 may inflate the bladders 202 through the flexible conduits 206. When the user presses against a physical object (e.g., a table surface, a wall surface, a controller, etc.) with sufficient force to overcome a predetermined threshold, the fluidic valve assembly 204 may vent the bladder 202 to allow the bladder 202 to collapse, providing a tactile sensation (e.g., a "popping" and/or "button-clicking" sensation) to the user of interacting with a physical object (e.g., a physical button, a physical key of a keyboard, etc.). The predetermined threshold may be altered to provide different sensations, such as the sensation of pushing against a stronger or weaker button or keyboard key.

As shown in FIG. 2, the fluidic valve assembly 204 may be positioned on the glove 201 to be over the user's wrist or back of the hand. However, the present disclosure is not so limited. For example, the fluidic valve assembly 204 may include a plurality of valves, each positioned near or along a respective finger portion of the glove 201. In additional embodiments, the fluidic valve assembly 204 may be positioned to be on the user's arm, shoulder, back, or any other suitable body part.

The conduits 206 may be formed of any flexible material that is capable of conveying a fluid to and from the bladders 202 for inflation and/or deflation. In some examples, the material of the conduits 206 may be selected to be capable of bending, with substantially low expansibility in a radial direction. For example, the conduits 206 may include a composite material, such as an elastomeric tube covered with a fibrous (e.g., textile, carbon fiber, metal fiber/wire mesh, etc.) material to inhibit expansion in the radial direction when pressurized.

In some examples, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

The bladders 202 are shown in FIG. 2 as being positioned on fingertip portions of the glove 201, but other positions are also included in the present disclosure. For example, a bladder 202A (illustrated by dashed lines in FIG. 2), which may be coupled to the fluidic valve assembly 204 via a respective conduit 206A (illustrated by dashed lines in FIG. 2), may optionally be positioned along a side of a forefinger portion of the glove 201. The bladder 202A may be positioned in a location to be depressed by the user's thumb. In this position, the bladder 202A may be used as a user input button, similar to a thumb button of a conventional controller. Like the other bladders 202, the bladder 202A to be depressed by the thumb may also be inflatable and collapsible when the user presses against the bladder 202A with sufficient pressure to overcome a predetermined threshold, to provide the user with tactile feedback, such as to confirm to the user that the system has perceived the intended interaction with the bladder 202A and accepted an input. Moreover, instead of or in addition to being positioned on a fingertip portion of the glove 201, the bladders 202 may be positioned in a location to be depressed by a finger, or to be depressed by another body part or object. For example, the bladders 202 according to embodiments of the present disclosure may be positioned on a palm portion of the glove 201, on a wristband, on a shoe, on a headband, on a controller, etc.

FIG. 2 illustrates a single bladder 202 at each fingertip portion of the glove 201. In additional embodiments, multiple bladders 202 may be positioned at one or more of the individual fingertip portions of the glove 201. In examples employing multiple bladders 202 in an individual fingertip portion, the multiple bladders 202 may be used to provide additional tactile feedback signals to the user. For example, users of conventional, physical keyboards often orient their fingers relative to the keys of the keyboards by feeling edges of the keys. The multiple bladders 202 on an individual fingertip may be selectively inflated and/or deflated as the fingertip is positioned in different locations relative to a key of a virtual keyboard to provide pressure points on the fingertip, which may indicate that an edge of the key has been reached. As the fingertip is moved over a center of the virtual key, all of the multiple bladders 202 on the fingertip may be inflated, providing a sensation of even pressure across an area of the fingertip. Thus, the user may be able to physically sense when a fingertip is properly positioned over an intended key.

FIGS. 3A and 3B are cross-sectional side views of a tactile input mechanism 300 (also referred to as "mechanism 300" for simplicity) respectively in expanded and contracted states. By way of example and not limitation, the mechanism 300 may be used as the tactile input mechanism (e.g., the bladders 202, fluidic valve assembly 204, and conduits 206) in the glove 201 of FIG. 2.

As shown in FIGS. 3A and 3B, the mechanism 300 may include an inflatable bladder 302, a fluidic valve assembly 304, and a conduit 306, as described above. In addition, the mechanism 300 may include a pressure sensor 308 in the form of a first electrode 310, at least one second electrode 312 positioned on opposing sides of the bladder 302, and a control subsystem 313. The first electrode 310 and the second electrode(s) 312 may be collectively referred to herein as "electrodes 310, 312" for simplicity. In some embodiments, the first electrode 310 may be configured to function as a receiver electrode, and the second electrode 312 may be configured to function as a transmitter electrode. Optionally, one or more of the electrodes 310, 312 may include or be coupled to a support substrate to increase a stiffness (e.g., to substantially maintain a planarity) thereof.

The pressure sensor 308 may sense a pressure within the bladder 302 by electrically sensing a distance between the first electrode 310 and the second electrode(s) 312. For example, a capacitance between the electrodes 310, 312 may be sensed by the control subsystem 313 to determine the distance therebetween. In FIG. 3A, the bladder 302 is illustrated as fully inflated and the electrodes 310, 312 are separated by a first distance $D_1$. FIG. 3B illustrates the bladder 302 after a user has pressed on the bladder 302 with an applied force F (e.g., a force of a fingertip pressing against a physical object through the bladder 302). The applied force F may at least partially collapse the bladder 302 and may position the electrodes 310, 312 at a second, closer distance $D_2$ from each other. As the electrodes 310, 312 are brought closer together, the capacitance between the electrodes 310, 312 may increase. This increase in capacitance may be sensed by the control subsystem 313 and correlated to an induced pressure change in the bladder 302. When the pressure in the bladder 302 reaches a predetermined threshold, the control subsystem 313 may cause the fluidic valve assembly 304 to vent the bladder 302, allowing the bladder 302 to fully collapse. When the bladder 302 collapses, the user may feel the impact between an upper portion of the bladder 302 and the lower portion of the bladder 302.

In some examples, any relational term, such as "first," "second," "upper," "lower," "on," "over," etc., may be used for clarity and convenience in understanding the disclosure and accompanying drawings and does not connote or depend on any specific preference, orientation, or order, except where the context clearly indicates otherwise.

As shown in FIGS. 3A and 3B, the electrodes 310, 312 may be positioned on or adjacent to an outer surface of the bladder 302. In additional embodiments, one or more of the electrodes 310, 312 may be positioned within the bladder 302.

In some embodiments, optionally, a cushion element 314 may be positioned within or adjacent to the bladder 302, such as within the bladder 302, between one of the electrodes 310, 312 and the bladder 302, and/or on an opposite side of one of the electrodes 310, 312 from the bladder 302. The cushion element 314 may be positioned and configured to cushion, relative to a physical surface against which the user presses through the bladder 302, the intended user's finger within the finger portion of the glove. Thus, when the bladder 302 collapses, an impact sensed by the user's finger may be cushioned by the cushion element 314. By way of example and not limitation, the cushion element 314 may be or include any material that may provide such a cushioning effect, such as a foam material, a silicone material, an elastomer material, a spring element, etc. In one example, the cushion element 314 may be or include another fluid-filled bladder. In additional embodiments, a cushioning effect may be provided by only partially venting the bladder 302, such that a certain volume of fluid (e.g., 10% or 20% of the fluid initially held by the bladder) remains within the bladder after the collapse to provide a fluidic cushion.

As shown in FIGS. 3A and 3B, the second electrode(s) 312 may include two or more individual electrodes 312. However, the present disclosure is not so limited. For example, the second electrode 312 may be composed of one, two, three, four, or more than four individual second electrodes 312. In the case of multiple second electrodes 312, the first electrode 310 may be configured as a common electrode. Individual capacitances between the first electrode 310 and the various respective second electrodes 312 may be sensed by the control subsystem 313 to determine an average distance between each of the second electrodes 312 and the first electrode 310. Such embodiments with multiple second electrodes 312 may enable a variety of additional uses and configurations. For example, if a user presses against the bladder 302 at a non-parallel angle, the distances and, therefore, capacitances between the respective second electrodes 312 and first electrode 310 may be different. The control subsystem 313 may sense the difference in capacitances to determine the angle (or approximate angle). This capability may enable the tactile input mechanism 300 to be used for a variety of purposes, such as to move a cursor or other virtual object, to adjust a virtual setting (e.g., brightness, color saturation, transparency, zoom, sound volume, etc.), and/or to input other distinct or variable commands in an artificial-reality environment. For example, the mechanism 300 with multiple second electrodes 312 may be used like a traditional joystick controller as the user presses against a surface at various angles. The second electrode(s) 312 may be positioned in a glove to be on a finger-side of the bladder 302 or on a side of the bladder 302 opposite an intended location for a user's finger.

In some embodiments, one of the electrodes 310, 312 of each mechanism 300 of a plurality of mechanisms 300 (e.g., as may be employed in various finger portions of the glove 201 of FIG. 2) may be electrically coupled to each other as a common electrode. This configuration may simplify electronics (e.g., the control subsystem 313) for operating the mechanism 300, compared to embodiments in which the electrodes 310, 312 of each mechanism 300 are not electrically coupled to each other.

The electrodes 310, 312 may also serve other purposes, in addition to sensing a pressure applied to the bladder 302. For example, the electrodes 310, 312 may be used to sense when a user touches two fingers (e.g., a finger and a thumb of the same hand, two fingers of different hands, etc.) to each other or a finger against another body part or physical object (e.g., a palm, a wrist, a controller, a headband, an artificial-reality display element, etc.). In this case, when the user positions the electrodes 310, 312 of two different mechanisms 300 against or close to each other, the control subsystem 313 may sense that the two fingers (or other corresponding elements) are touching or are close to each other. This information may be used in an artificial-reality environment, such as to indicate that the user is pinching or holding a virtual object, that the user has contacted a physical object, etc.

Alternatively or additionally, the pressure within the bladder 302 may be sensed using another pressure sensor 308A, shown in FIG. 3A in dashed lines. The other pressure sensor 308A may be positioned, for example, along the conduit 306. In additional examples, the other pressure sensor 308A may be incorporated in the fluidic valve assembly 304. The other pressure sensor 308A may be any sensor capable of sensing a fluid pressure, such as an electromagnetic pressure sensor, a strain-gauge pressure sensor, a capacitive pressure sensor, an optical pressure sensor, a resonant pressure sensor, etc. The other pressure sensor 308A may be used in place of or in addition to the pressure sensor 308 described above.

FIGS. 4A-4C are schematic views of respective fluidic valve assemblies 400A, 400B, 400C (collectively referred to as "valve assemblies 400") that may be employed to inflate and/or deflate inflatable bladders (e.g., the bladders 202, 302 described above) of the present disclosure. For example, any of the fluidic valve assemblies 400A, 400B, 400C may be used as, or as a part of, the fluidic valve assemblies 204, 304 described above.

Referring to FIG. 4A, a first fluidic valve assembly 400A is represented as a three-way valve that includes a subject fluid port 402A, a vent port 404A, and a source fluid port 406A. The subject fluid port 402A may be in fluid communication with an inflatable bladder, such as through a conduit, as explained above with reference to FIGS. 2 and 3. A valve block 408A may be configured to fluidly connect the subject fluid port 402A alternately to the vent port 404A to deflate the corresponding bladder (e.g., when a tactile input mechanism is in a deactivated mode or when a predetermined pressure threshold is reached, as described above) or to the source fluid port 406A to inflate (or maintain inflation of) the bladder (e.g., when the tactile input mechanism is in an activated mode or to re-inflate the bladder after collapsing). The valve block 408A may be electromechanically operable.

The vent port 404A may be open to a surrounding atmosphere or may be in fluid communication with a low pressure (e.g., atmospheric pressure, vacuum, etc.) drain. The source fluid port 406A may be in fluid communication with a pressurized source (e.g., pressurized compared to the surrounding atmosphere), such as a pump, fan, pressurized chamber, etc.

Although the first fluidic valve assembly 400A is illustrated in FIG. 4A as a three-way valve, the present disclosure is not so limited. For example, the subject fluid port 402A may be split into two subject fluid ports 402A, one of which may be in fluid communication with the vent port 404A and the other of which may be in fluid communication with the source fluid port 406. In this configuration, the valve block 408A may be configured to allow fluid to be conveyed from the source fluid port 406A to the bladder during an inflation stage and may block fluid flow from the source fluid port 406A during a deflation stage. Similarly, the valve block 408A may also be configured to allow fluid to be conveyed from the bladder to the vent port 404A during the deflation stage and may block fluid flow to the vent port 404A during the inflation stage.

FIG. 4B illustrates a second fluidic valve assembly 400B that may include a subject fluid port 402B, a valve block 408B, and a vent/source port 410B. The subject fluid port 402B may be similar to the subject fluid port 402A discussed above. The vent/source port 410B may be in fluid communication with a low-pressure fluid, such as a surrounding atmosphere or an unpressurized fluid chamber. The valve block 408B may include or be coupled to a pump, which may operable to convey fluid from the vent/source port 410B to the subject fluid port 402B to inflate a corresponding bladder and may allow fluid to be conveyed from the subject fluid port 402B to the vent/source port 410B to deflate the corresponding bladder. In this example, the valve block 408A may be electromechanically operable.

FIG. 4C illustrates a third fluidic valve assembly 400C that may include a subject fluid port 402C, a source fluid chamber 412C, and a fluidic capacitor 414C positioned between the subject fluid port 402C and the source fluid chamber 412C. The fluidic capacitor 414C may include a mechanism that, analogous to an electrical capacitor, is configured to store fluidic energy (e.g., pressure) until a certain threshold is reached, after which the fluidic energy is released. For example, pressures within the source fluid chamber 412C and a corresponding bladder may initially be in substantial equilibrium.

When a user presses against the bladder with a force, fluidic pressure may build up in the fluidic capacitor 414C. When a predetermined threshold is reached, the built-up fluidic pressure may be released from the fluidic capacitor 414C to the source fluid chamber 412C, causing the bladder to collapse as described above. As a result, the source fluid chamber 412C may become pressurized (e.g., compared to a surrounding atmosphere).

When the force against the bladder is released by the user, the pressurized fluid within the source fluid chamber 412C may flow into the fluidic capacitor 414C and the predetermined threshold may be reached. The fluidic capacitor 414C may then flow fluid from the source fluid chamber 412C to the bladder through the subject fluid port 402C to re-inflate the bladder. In this case, at least some of the energy (e.g., all of the energy or a portion of the energy) to operate the third fluidic valve assembly 400C may be supplied by the user pressing the corresponding bladder against a physical surface.

FIG. 5 is a graph 500 illustrating an example relationship between displacement and force of a tactile input mechanism according to embodiments of the present disclosure. For example, the graph 500 may represent a displacement of the electrodes (e.g., the electrodes 310, 312 of FIG. 3) on opposing sides of an inflatable bladder (e.g., the bladder 202 of FIG. 2 or the bladder 302 of FIGS. 3A and 3B) as a user of a glove (e.g., the glove 201 of FIG. 2) presses against the inflatable bladder with an applied force. In the graph 500 of FIG. 5, the initial state with an inflated bladder and the electrodes at their greatest displacement is at the right end of the illustrated curve, and the collapsed state with the electrodes close to each other is at the left end of the illustrated curve. As the applied force (and a resulting pressure) increases, the displacement between the electrodes may decrease as the electrodes approach each other. When the applied force reaches a predetermined threshold 502, the bladder may be allowed to vent, and the applied force may significantly decrease while the displacement may continue to decrease. The user may sense the quick reduction in force after reaching the threshold 502 and venting as a "pop" or "click" sensation, like the feeling of pressing on a physical keyboard key or a physical button.

FIG. 6 is an overhead view of two wearable devices 200 in the form of gloves 201 in use in an artificial-reality environment 600. Specifically, FIG. 6 illustrates a virtual keyboard 602 displayed to appear to the user to be on or over a surface of a physical object, such as a table. For example, the virtual keyboard 602 may be displayed by a projector subsystem 604. For example, the projector subsystem 604 may include an optical projector, a display screen at or adjacent to the physical surface, and/or a near-eye display (e.g., a virtual-reality display, an augmented-reality display, etc.) worn by the user. The virtual keyboard 602 may be displayed in a manner that the virtual keyboard 602 appears to be on or over the surface of the physical object. In yet further examples, the virtual keyboard 602 may be a physical depiction (e.g., a printed picture, drawing, or sticker) of a keyboard, but may not be a functional electromechanical keyboard.

A tracking subsystem 606, which may include one or more optical sensors (e.g., visible light sensor arrays, infrared light sensor arrays, etc.) may be configured to track a location of at least the fingertip portions of the gloves 201 relative to the physical object and/or relative to the virtual keyboard. The gloves 201 may have one or more visibly distinctive features that may be recognizable by the tracking subsystem 606 to aid in tracking the fingertip portions of the gloves 201. The tracking subsystem 606 may be positioned on a head-mounted device or in a fixed location in a surrounding physical environment.

As with conventional typing on a physical keyboard, the user may place the fingertips over desired keys of the virtual keyboard and may press down when a keystroke is intended. The user may press against the surface of the physical object through an inflatable bladder in the glove 201. As explained above, after the pressure in the bladder increases and reaches a predetermined threshold, the bladder may be vented and the bladder may collapse to give a sensation of a physical keystroke to the user. At the time the bladder is vented and collapses, the system may register the intended keystroke. After the intended keystroke is registered, the bladder may be re-inflated to be ready for the next intended keystroke, as described above.

FIG. 7 is a flow diagram illustrating a method 700 for forming a tactile input mechanism, such as, for example, the tactile input mechanism 300 described above with reference to FIG. 3. At operation 710, at least one pressure sensor may be operatively coupled to at least one inflatable bladder. The pressure sensor may be positioned and configured to sense pressure exerted against the bladder. Operation 710 may be performed in a variety of ways. For example, a receiver electrode may be positioned adjacent to a first side (e.g., a finger-facing side) of the bladder and at least one transmitter electrode may be positioned adjacent to a second, opposite side (e.g., a side opposite the finger-facing side) of the bladder. The electrodes may be configured for sensing a capacitance, which may be correlated to a distance and ultimately to a pressure, between the electrodes. In additional examples, operation 710 may be performed by operatively coupling a pressure sensor (e.g., an electromagnetic pressure sensor, a strain-gauge pressure sensor, a capacitive pressure sensor, an optical pressure sensor, a resonant pressure sensor, etc.) to a conduit or fluidic valve assembly that may be in fluid communication with the bladder.

At operation 720, at least one fluidic valve may be operatively coupled and in fluid communication with the inflatable bladder to vent the inflatable bladder. The fluidic valve may be configured to vent the bladder in response to the sensed pressure reaching a predetermined threshold, which may cause the bladder to collapse. Operation 720 may be performed in a variety of ways. For example, any of the fluidic valve assemblies 400A, 400B, 400C described above may be operatively coupled with the inflatable bladder, such as via a conduit. In addition, the fluidic valve may be configured to inflate the bladder, as discussed above.

In some examples, the inflatable bladder, pressure sensor, and fluidic valve may form a tactile input mechanism that may be incorporated into a wearable device. For example, such a tactile input mechanism may be positioned on or in a glove such that the inflatable bladder is positioned over a fingertip portion of the glove. As explained above, in additional examples, such tactile input mechanisms and bladders thereof may be positioned in other locations in gloves or in other wearable devices.

FIG. 8 is a flow diagram illustrating a method 800 for using an artificial-reality system, according to some embodiments of the present disclosure. At operation 810, a virtual object (e.g., a keyboard, a button, etc.) may be projected on a physical surface or on an image of the physical surface. Operation 810 may be performed in a variety of ways. For example, a virtual object may be displayed by a projector subsystem on a physical surface (e.g., of a table) or may be displayed on a near-eye display worn by a user such that the virtual object appears to the user to be on or over the physical surface. In a virtual-reality context and by way of example, the virtual object may be displayed on or over an image of the physical surface or a virtual object in a perceived position of the physical surface. In an augmented-reality context and by way of another example, an image of the virtual object may be displayed to overlay the user's view of the physical surface.

At operation 820, a pressure exerted against the inflatable bladder by the physical surface may be sensed, such as by a pressure sensor that is operatively coupled to the bladder. Operation 820 may be performed in a variety of ways. For example, the exerted pressure may result from a user pressing the bladder against the physical surface. The pressure may be sensed by a first electrode positioned on one side of the bladder and at least one second electrode positioned on an opposite side of the bladder, as explained above. In additional embodiments, the pressure may be sensed by another pressure sensor that is in fluid communication with a conduit or fluidic valve assembly that is, in turn, in fluid communication with the bladder, as also explained above.

At operation 830, the inflatable bladder may be vented in response to the sensed pressure reaching a predetermined threshold. Operation 830 may be performed in a variety of ways. For example, the bladder may be vented in any of the manners explained above with reference to FIGS. 4A-4C and 5. The venting of the bladder may provide tactile feedback to the user in the form of a "pop" or "click" similar to the sensation of depressing a physical button or physical keyboard key.

In some embodiments, after the inflatable bladder is vented, the inflatable bladder may be re-inflated to be ready for another interaction by the user. For example, the inflatable bladder may be re-inflated after a predetermined time has passed since venting, such as 10 ms, 20 ms, 50 ms, 100 ms, 200 ms, etc. The predetermined time may be adjustable, such as to accommodate the variable speed at which different users type or otherwise interact with a virtual object. In another example, a low inflation pressure may be repeatedly pulsed into the bladder. When a predetermined pressure level in the bladder is reached, such as due to the user lifting a finger from the physical surface, the bladder may be fully inflated.

Accordingly, the present disclosure includes various mechanisms, systems, and methods that may be employed to provide tactile feedback to a user interacting with a physical surface, such as in an artificial-reality context. As noted and described above, embodiments of the present disclosure may provide the user with the sensation of a tactile key of a standard keyboard and may be more comfortable than tapping directly on a hard surface. The sensation may be tailored to the preferences of the user, such as to require a higher-pressure threshold before collapse for a sensation of a stiffer keystroke or a lower pressure threshold for a sensation of a softer keystroke. Additional and alternative advantages and capabilities of embodiments of the present disclosure may be readily ascertained upon review of the present disclosure.

As noted above, embodiments of the present disclosure may include or be implemented in conjunction with various types of artificial-reality systems. Artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 900 in FIG. 9. Other artificial-reality systems may include an NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
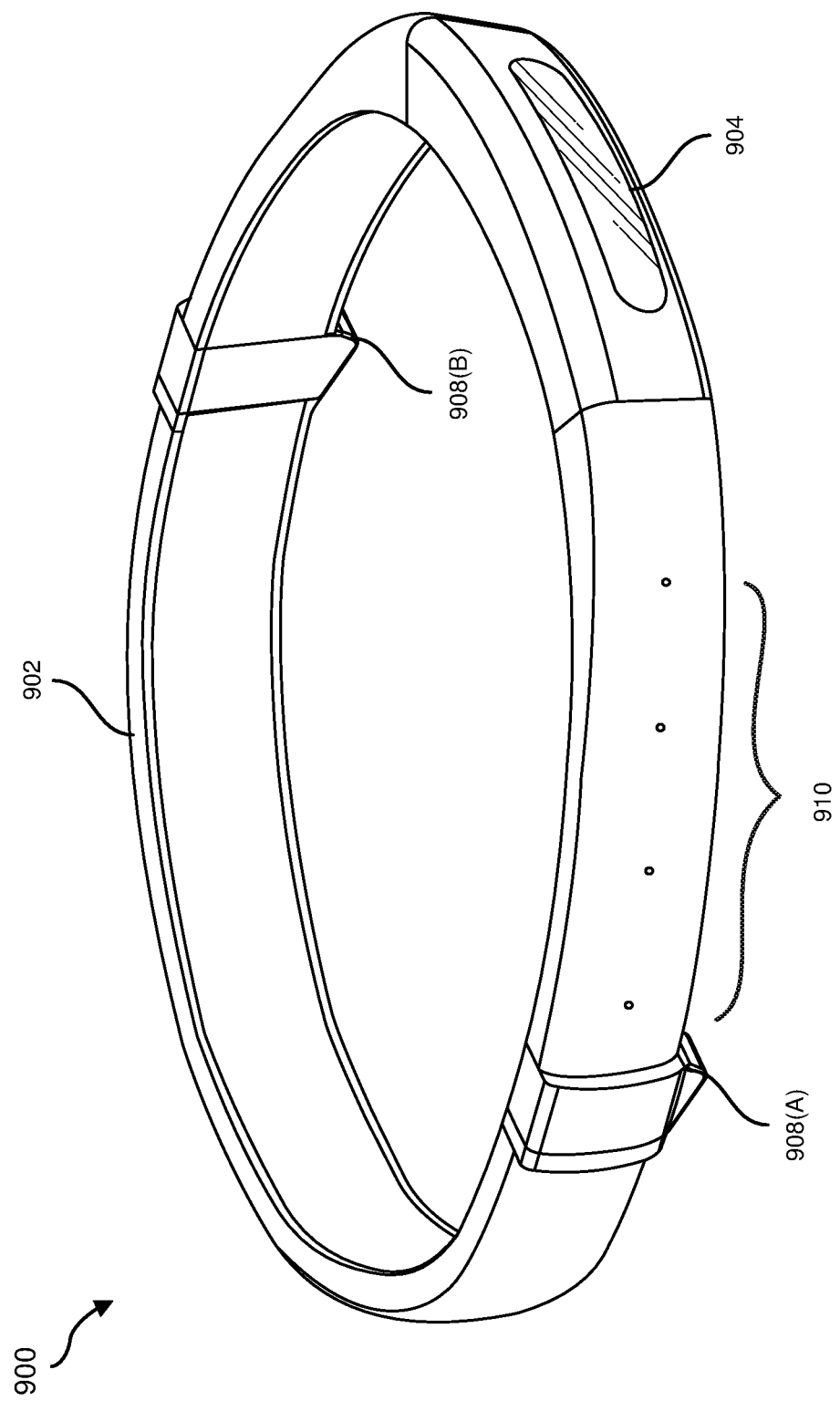
FIG. 9 is an illustration of an example artificial-reality headband that may be used in connection with embodiments of this disclosure.

Turning to FIG. 9, the augmented-reality system 900 generally represents a wearable device dimensioned to fit about a body part (e.g., a head) of a user. As shown in FIG. 9, the system 900 may include a frame 902 and a camera assembly 904 that is coupled to the frame 902 and configured to gather information about a local environment by observing the local environment. The augmented-reality system 900 may also include one or more audio devices, such as output audio transducers 908(A) and 908(B) and input audio transducers 910. The output audio transducers 908(A) and 908(B) may provide audio feedback and/or content to a user, and the input audio transducers 910 may capture audio in a user's environment.

As shown, the augmented-reality system 900 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the augmented-reality system 900 may not include an NED, augmented-reality system 900 may include other types of screens or visual feedback devices (e.g., a display screen integrated into a side of the frame 902).

Figure 10:
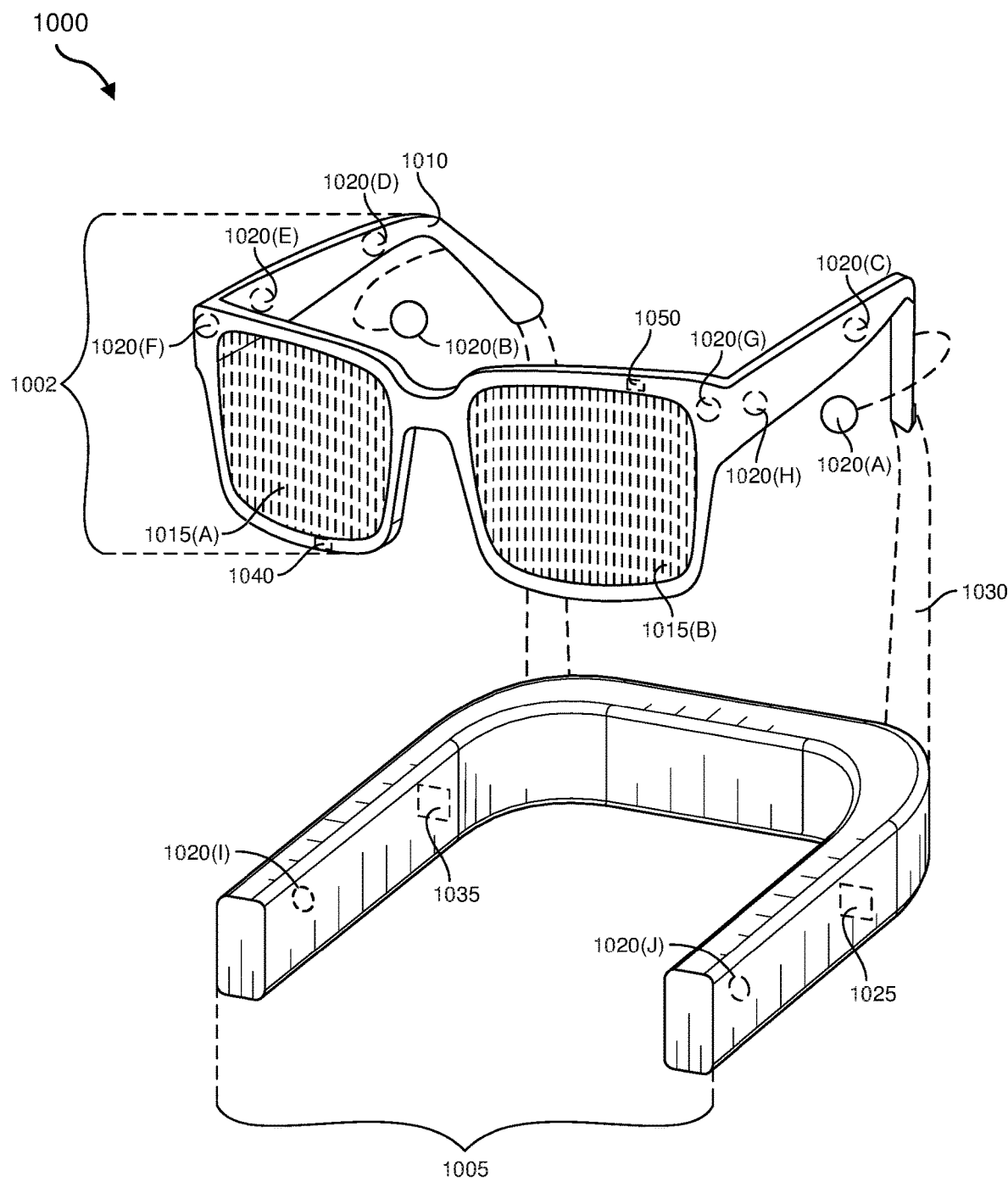
FIG. 10 is an illustration of example augmented-reality glasses that may be used in connection with embodiments of this disclosure.

The embodiments discussed in this disclosure may also be implemented in augmented-reality systems that include one or more NEDs. For example, as shown in FIG. 10, the augmented-reality system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the augmented-reality system 1000 includes two displays, embodiments of this disclosure may be implemented in augmented-reality systems with a single NED or more than two NEDs.

In some embodiments, the augmented-reality system 1000 may include one or more sensors, such as sensor 1040. The sensor 1040 may generate measurement signals in response to motion of the augmented-reality system 1000 and may be located on substantially any portion of the frame 1010. The sensor 1040 may represent a position sensor, an inertial measurement unit (IMU), a depth camera assembly, or any combination thereof. In some embodiments, the augmented-reality system 1000 may or may not include the sensor 1040 or may include more than one sensor. In embodiments in which the sensor 1040 includes an IMU, the IMU may generate calibration data based on measurement signals from the sensor 1040. Examples of the sensor 1040 may include, without limitation, accelerometers, gyroscopes, magnetometers, other suitable types of sensors that detect motion, sensors used for error correction of the IMU, or some combination thereof.

The augmented-reality system 1000 may also include a microphone array with a plurality of acoustic transducers 1020(A)-1020(J), referred to collectively as acoustic transducers 1020. The acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on the frame 1010, and/or acoustic transducers 1020(I) and 1020(J), which may be positioned on a corresponding neckband 1005.

In some embodiments, one or more of the acoustic transducers 1020(A)-(F) may be used as output transducers (e.g., speakers). For example, the acoustic transducers 1020(A) and/or 1020(B) may be earbuds or any other suitable type of headphone or speaker.

The configuration of the acoustic transducers 1020 of the microphone array may vary. While the augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on the frame 1010, an orientation associated with each acoustic transducer 1020, or some combination thereof.

The acoustic transducers 1020(A) and 1020(B) may be positioned on different parts of the user's ear, such as behind the pinna or within the auricle or fossa. Or, there may be additional acoustic transducers 1020 on or surrounding the ear in addition to the acoustic transducers 1020 inside the ear canal. Having an acoustic transducer 1020 positioned next to an ear canal of a user may enable the microphone array to collect information on how sounds arrive at the ear canal. By positioning at least two of the acoustic transducers 1020 on either side of a user's head (e.g., as binaural microphones), the augmented-reality device 1000 may simulate binaural hearing and capture a 3D stereo sound field around about a user's head. In some embodiments, the acoustic transducers 1020(A) and 1020(B) may be connected to the augmented-reality system 1000 via a wired connection 1030, and in other embodiments, the acoustic transducers 1020(A) and 1020(B) may be connected to the augmented-reality system 1000 via a wireless connection (e.g., a Bluetooth connection). In still other embodiments, the acoustic transducers 1020(A) and 1020(B) may not be used at all in conjunction with the augmented-reality system 1000.

The acoustic transducers 1020 on the frame 1010 may be positioned along the length of the temples, across the bridge, above or below the display devices 1015(A) and 1015(B), or some combination thereof. The acoustic transducers 1020 may be oriented such that the microphone array is able to detect sounds in a wide range of directions surrounding the user wearing the augmented-reality system 1000. In some embodiments, an optimization process may be performed during manufacturing of the augmented-reality system 1000 to determine relative positioning of each acoustic transducer 1020 in the microphone array.

In some examples, the augmented-reality system 1000 may include or be connected to an external device (e.g., a paired device), such as the neckband 1005. The neckband 1005 generally represents any type or form of paired device. Thus, the following discussion of the neckband 1005 may also apply to various other paired devices, such as charging cases, smart watches, smart phones, wrist bands, other wearable devices, hand-held controllers, tablet computers, laptop computers and other external compute devices, etc.

As shown, the neckband 1005 may be coupled to the eyewear device 1002 via one or more connectors. The connectors may be wired or wireless and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and the neckband 1005, the components may be located elsewhere and/or distributed differently on the eyewear device 1002 and/or the neckband 1005. In some embodiments, the components of the eyewear device 1002 and the neckband 1005 may be located on one or more additional peripheral devices paired with the eyewear device 1002, the neckband 1005, or some combination thereof.

Pairing external devices, such as the neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 since users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a standalone eyewear device. Since weight carried in the neckband 1005 may be less invasive to a user than weight carried in the eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1005 may be communicatively coupled with the eyewear device 1002 and/or to other devices. These other devices may provide certain functions (e.g., tracking, localizing, depth mapping, processing, storage, etc.) to the augmented-reality system 1000. In the embodiment of FIG. 10, the neckband 1005 may include two acoustic transducers (e.g., 1020(I) and 1020(J)) that are part of the microphone array (or potentially form their own microphone subarray). The neckband 1005 may also include a controller 1025 and a power source 1035.

The acoustic transducers 1020(I) and 1020(J) of the neckband 1005 may be configured to detect sound and convert the detected sound into an electronic format (analog or digital). In the embodiment of FIG. 10, the acoustic transducers 1020(I) and 1020(J) may be positioned on the neckband 1005, thereby increasing the distance between the neckband acoustic transducers 1020(I) and 1020(J) and other acoustic transducers 1020 positioned on the eyewear device 1002. In some cases, increasing the distance between the acoustic transducers 1020 of the microphone array may improve the accuracy of beamforming performed via the microphone array. For example, if a sound is detected by the acoustic transducers 1020(C) and 1020(D) and the distance between the acoustic transducers 1020(C) and 1020(D) is greater than, e.g., the distance between the acoustic transducers 1020(D) and 1020(E), the determined source location of the detected sound may be more accurate than if the sound had been detected by the acoustic transducers 1020(D) and 1020(E).

The controller 1025 of the neckband 1005 may process information generated by the sensors on the neckband 1005 and/or the augmented-reality system 1000. For example, the controller 1025 may process information from the microphone array that describes sounds detected by the microphone array. For each detected sound, the controller 1025 may perform a direction-of-arrival (DOA) estimation to estimate a direction from which the detected sound arrived at the microphone array. As the microphone array detects sounds, the controller 1025 may populate an audio data set with the information. In embodiments in which the augmented-reality system 1000 includes an inertial measurement unit, the controller 1025 may compute all inertial and spatial calculations from the IMU located on the eyewear device 1002. A connector may convey information between the augmented-reality system 1000 and the neckband 1005 and between the augmented-reality system 1000 and the controller 1025. The information may be in the form of optical data, electrical data, wireless data, or any other transmittable data form. Moving the processing of information generated by the augmented-reality system 1000 to the neckband 1005 may reduce weight and heat in the eyewear device 1002, making it more comfortable to the user.

The power source 1035 in the neckband 1005 may provide power to the eyewear device 1002 and/or to the neckband 1005. The power source 1035 may include, without limitation, lithium ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 1100 in FIG. 11, that mostly or completely covers a user's field of view. The virtual-reality system 1100 may include a front rigid body 1102 and a band 1104 shaped to fit around a user's head. The virtual-reality system 1100 may also include output audio transducers 1106(A) and 1106(B). Furthermore, while not shown in FIG. 11, the front rigid body 1102 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in the augmented-reality system 1000 and/or the virtual-reality system 1100 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 1000 and/or the virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the augmented-reality system 900, the augmented-reality system 1000, and/or the virtual-reality system 1100 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 9 and 11, the output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 910 may include condenser microphones, dynamic microphones, ribbon microphones, and/or any other type or form of input transducer. In some embodiments, a single transducer may be used for both audio input and audio output.

Figure 11:
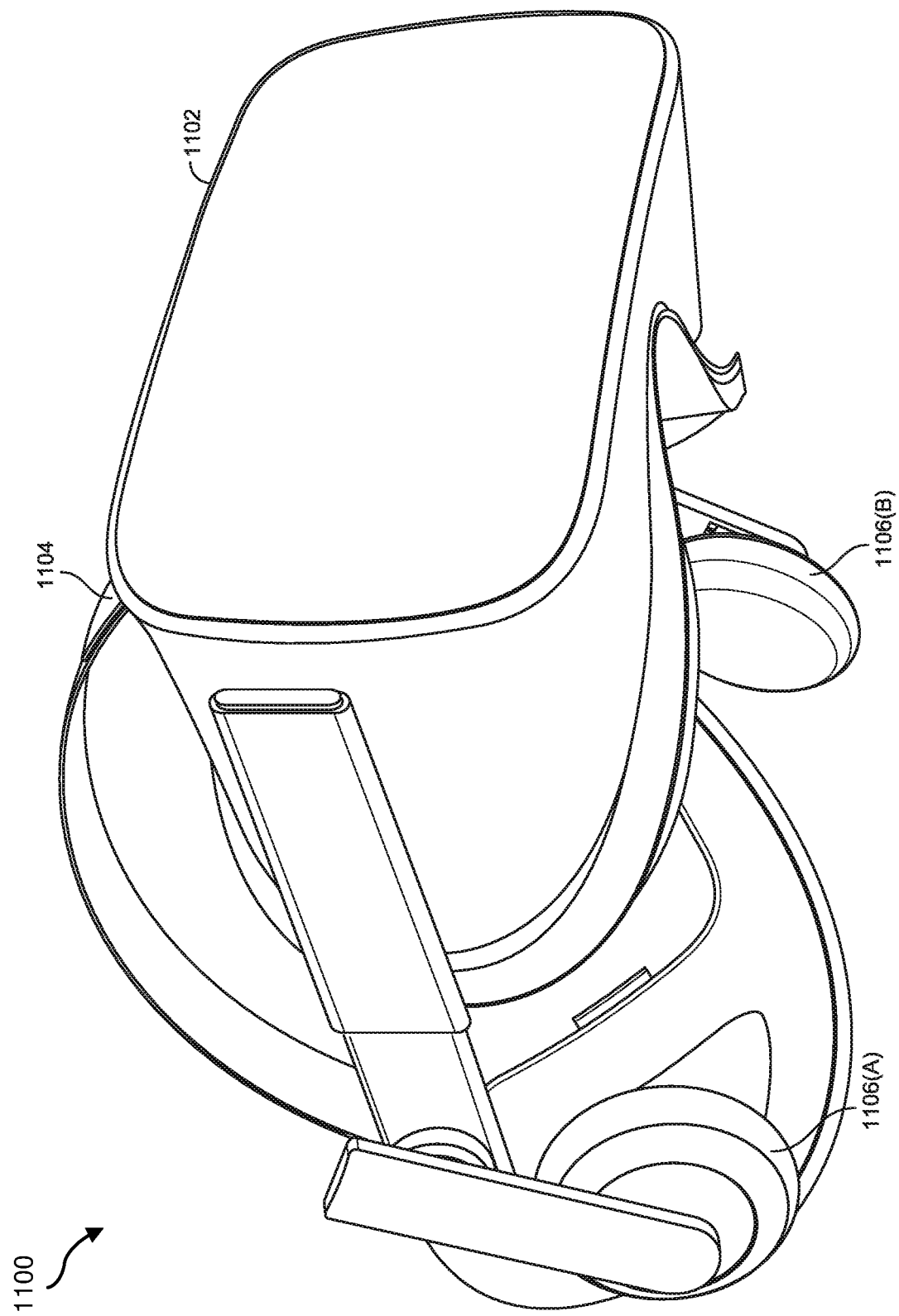
FIG. 11 is an illustration of an example virtual-reality headset that may be used in connection with embodiments of this disclosure.

While not shown in FIGS. 9-11, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, the artificial-reality systems 900, 1000, and 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
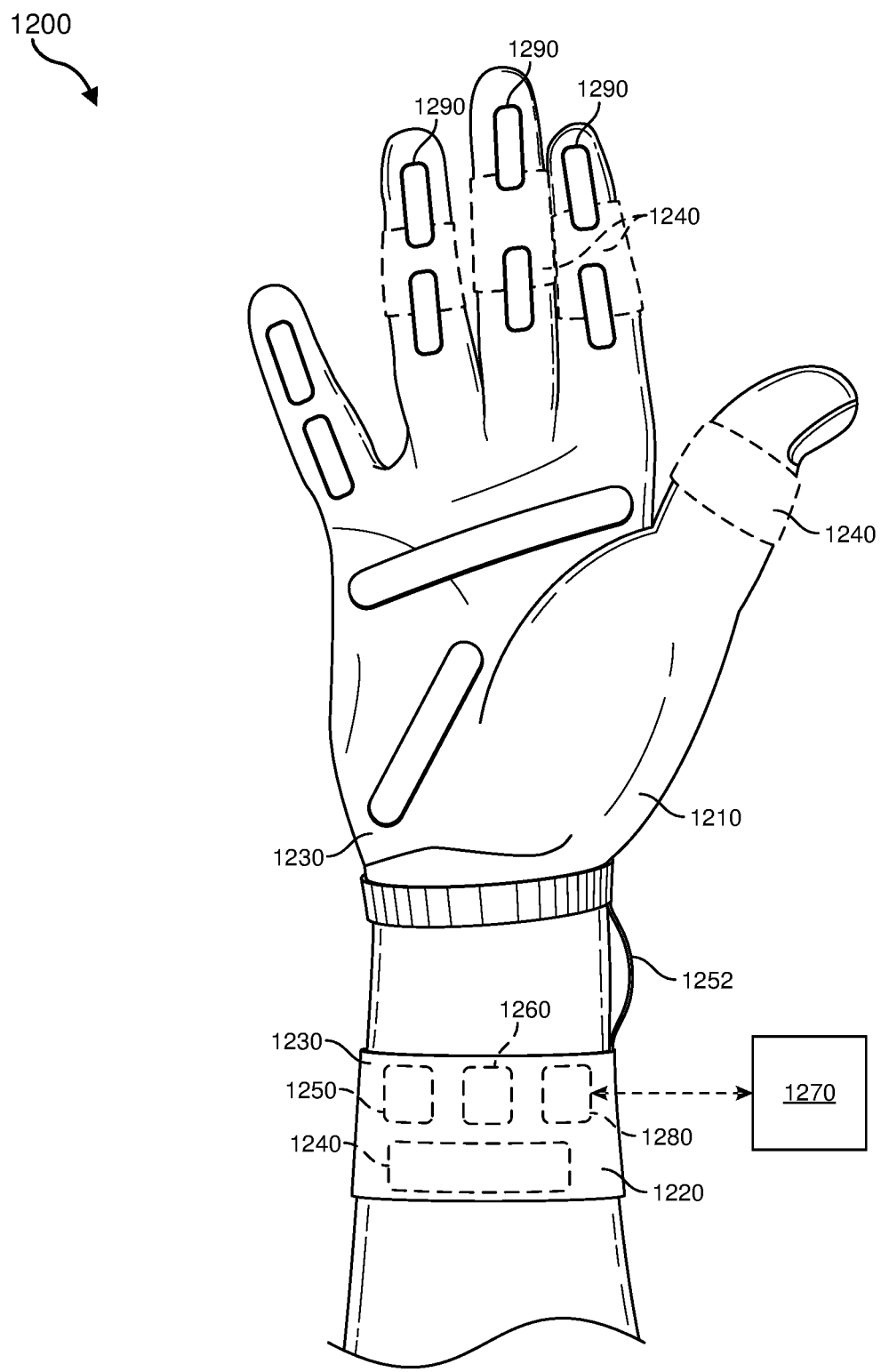
FIG. 12 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). The haptic device 1210 and the haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in the textile material 1230 of the vibrotactile system 1200. The vibrotactile devices 1240 may be positioned in locations to provide a vibrating sensation (e.g., haptic feedback) to a user of the vibrotactile system 1200. For example, the vibrotactile devices 1240 may be positioned to be against the user's finger(s), thumb, or wrist, as shown in FIG. 12. The vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to the vibrotactile devices 1240, such as via conductive wiring 1252. In some examples, each of the vibrotactile devices 1240 may be independently electrically coupled to the power source 1250 for individual activation. In some embodiments, a processor 1260 may be operatively coupled to the power source 1250 and configured (e.g., programmed) to control activation of the vibrotactile devices 1240.

The vibrotactile system 1200 may be implemented in a variety of ways. In some examples, the vibrotactile system 1200 may be a standalone system with integral subsystems and components for operation independent of other devices and systems. As another example, the vibrotactile system 1200 may be configured for interaction with another device or system 1270. For example, the vibrotactile system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1280 may enable communications between the vibrotactile system 1200 and the other device or system 1270 via a wireless (e.g., Wi-Fi, Bluetooth, cellular, radio, etc.) link or a wired link. If present, the communications interface 1280 may be in communication with the processor 1260, such as to provide a signal to the processor 1260 to activate or deactivate one or more of the vibrotactile devices 1240.

The vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, the vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although the power source 1250, the processor 1260, and the communications interface 1280 are illustrated in FIG. 12 as being positioned in the haptic device 1220, the present disclosure is not so limited. For example, one or more of the power source 1250, the processor 1260, or the communications interface 1280 may be positioned within the haptic device 1210 or within another wearable textile.

Figure 13:
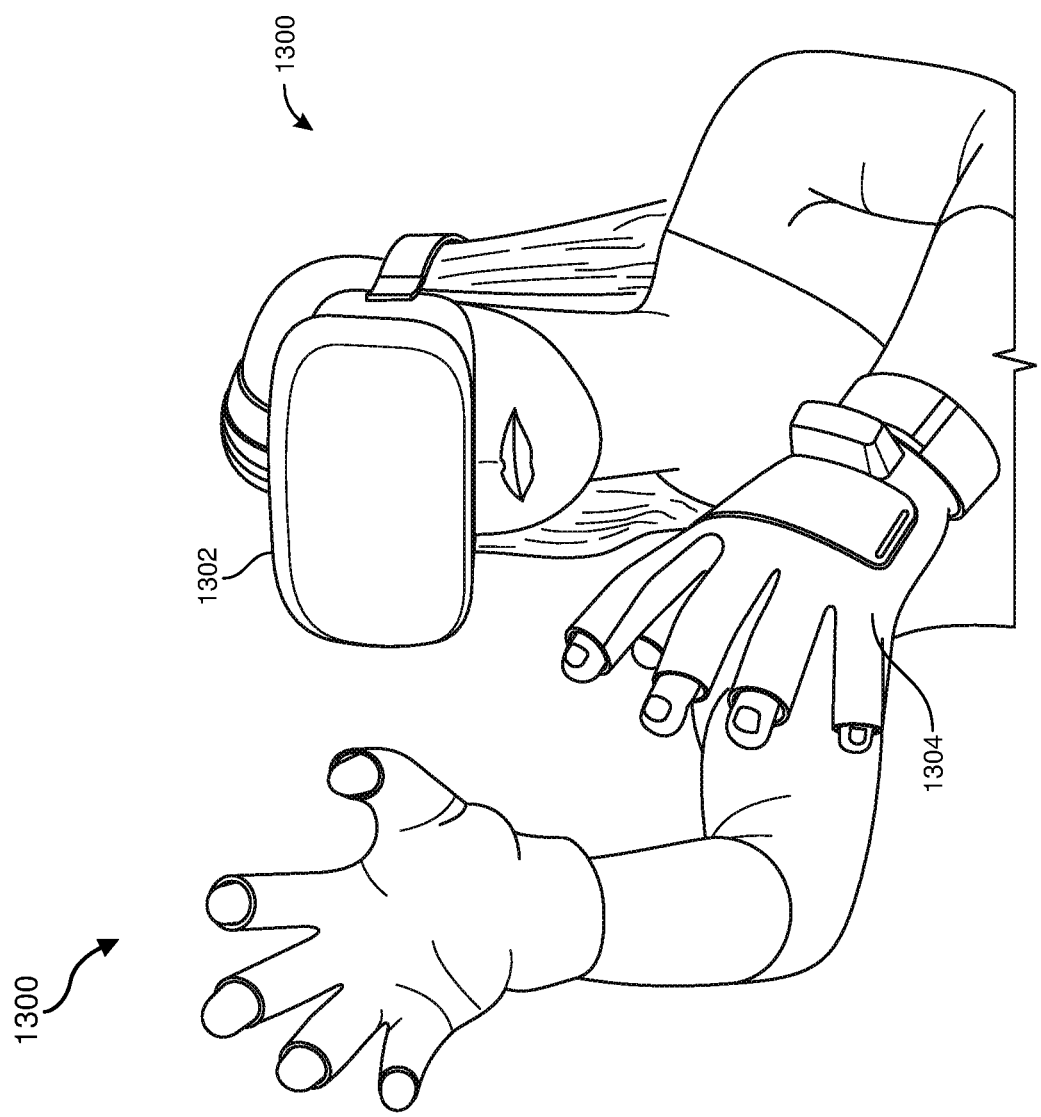
FIG. 13 is an illustration of an example virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1302 generally represents any type or form of virtual-reality system, such as the virtual-reality system 1100 in FIG. 11. Haptic device 1304 generally represents any type or form of wearable device, worn by a use of an artificial-reality system, that provides haptic feedback to the user to give the user the perception that he or she is physically engaging with a virtual object. In some embodiments, the haptic device 1304 may provide haptic feedback by applying vibration, motion, and/or force to the user. For example, the haptic device 1304 may limit or augment a user's movement. To give a specific example, the haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use the haptic device 1304 to send action requests to a console. Examples of action requests include, without limitation, requests to start an application and/or end the application and/or requests to perform a particular action within the application.

Figure 14:
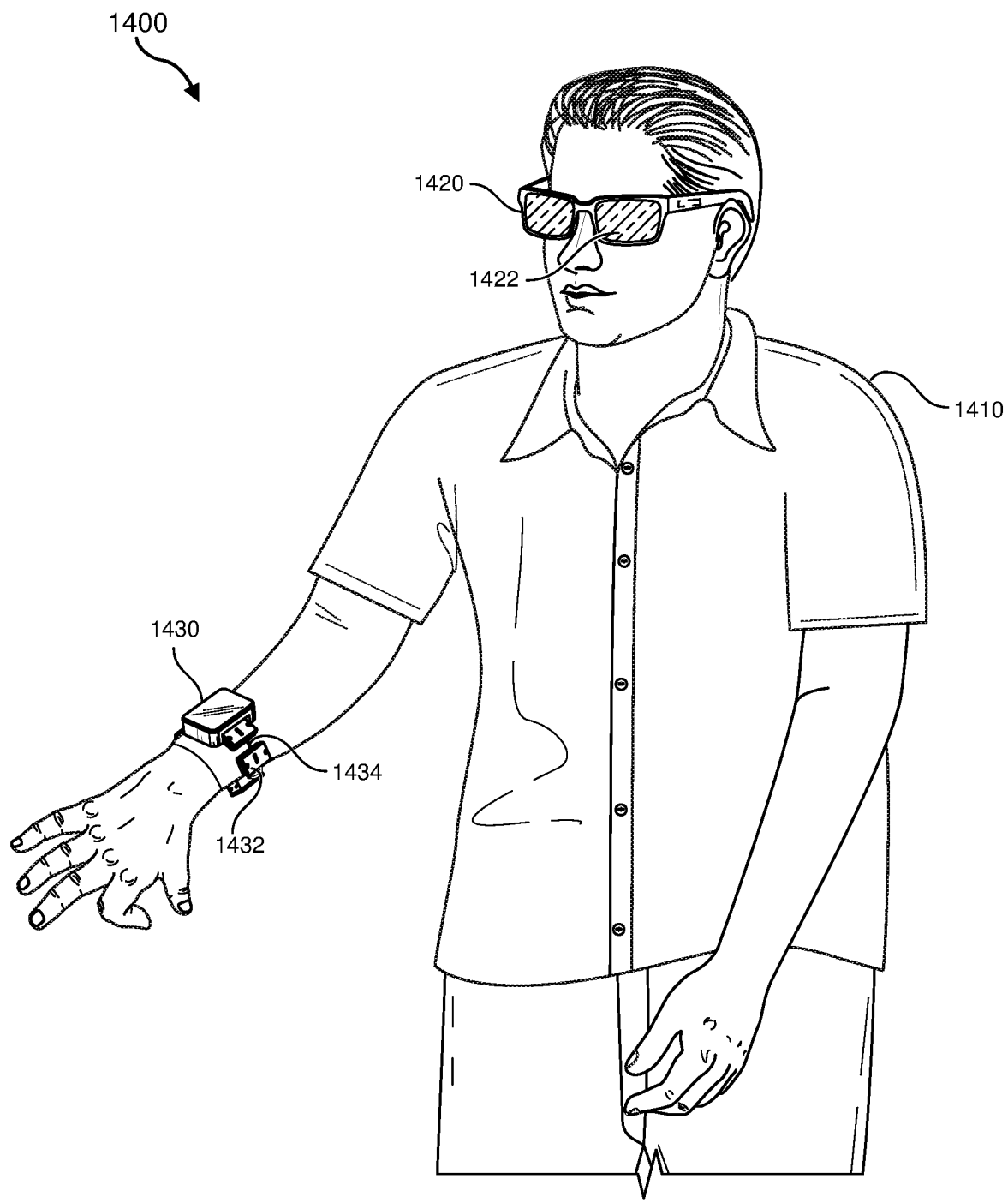
FIG. 14 is an illustration of an example augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view a user 1410 interacting with an augmented-reality system 1400. In this example, the user 1410 may wear a pair of augmented-reality glasses 1420 that have one or more displays 1422 and that are paired with a haptic device 1430. The haptic device 1430 may be a wristband that includes a plurality of band elements 1432 and a tensioning mechanism 1434 that connects band elements 1432 to one another.

One or more of the band elements 1432 may include any type or form of actuator suitable for providing haptic feedback. For example, one or more of the band elements 1432 may be configured to provide one or more of various types of cutaneous feedback, including vibration, force, traction, texture, and/or temperature. To provide such feedback, the band elements 1432 may include one or more of various types of actuators. In one example, each of the band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1210, 1220, 1304, and 1430 may include any suitable number and/or type of haptic transducer, sensor, and/or feedback mechanism. For example, the haptic devices 1210, 1220, 1304, and 1430 may include one or more mechanical transducers, piezoelectric transducers, and/or fluidic transducers. The haptic devices 1210, 1220, 1304, and 1430 may also include various combinations of different types and forms of transducers that work together or independently to enhance a user's artificial-reality experience. In one example, each of the band elements 1432 of the haptic device 1430 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A tactile input mechanism, including: a bladder dimensioned to hold a fluid; a pressure sensor coupled to the bladder and configured to sense a pressure exerted against the bladder; and a fluidic valve coupled to the bladder and configured to vent the bladder in response to the sensed pressure reaching a predetermined threshold.

Example 2: The tactile input mechanism of Example 1, wherein the pressure sensor includes: a receiver electrode positioned adjacent to a first side of the bladder; at least one transmitter electrode positioned adjacent to a second, opposite side of the bladder; and a control subsystem operably coupled to the receiver electrode and to the at least one transmitter electrode, wherein the control subsystem is configured to sense the pressure exerted against the bladder by measuring a capacitance between the receiver electrode and the at least one transmitter electrode.

Example 3: The tactile input mechanism of Example 2, wherein the at least one transmitter electrode includes a plurality of transmitter electrodes positioned adjacent to the second, opposite side of the bladder.

Example 4: The tactile input mechanism of Example 2 or Example 3, wherein at least one of the receiver electrode or the transmitter electrode is positioned at least partially within the bladder.

Example 5: The tactile input mechanism of any of Examples 1 through 4, further including a conduit coupling the fluidic valve to the bladder, wherein the pressure sensor is located along the conduit.

Example 6: The tactile input mechanism of any of Examples 1 through 5, further including a glove, wherein the bladder is positioned within a finger portion of the glove.

Example 7: The tactile input mechanism of Example 6, wherein the bladder is positioned within a fingertip portion of the glove.

Example 8: The tactile input mechanism of Example 6 or Example 7, wherein the bladder is positioned within the glove adjacent to a surface dimensioned to contact a side of a user's index finger when the glove is donned by the user.

Example 9: The tactile input mechanism of any of Examples 1 through 8, wherein the fluidic valve being configured to vent the bladder includes the fluidic valve being configured to partially vent the bladder such that a portion of the fluid initially held by the bladder remains within the bladder after venting.

Example 10: The tactile input mechanism of any of Examples 1 through 9, wherein the predetermined threshold is adjustable to enable the fluidic valve to vent the bladder in response to different sensed pressures.

Example 11: The tactile input mechanism of any of Examples 1 through 10, wherein the fluidic valve is further configured to refill the bladder with air after venting.

Example 12: An artificial-reality system, including: a projector subsystem configured to project a virtual object on a physical surface or on an image of the physical surface; a glove including at least one finger portion; a bladder positioned within the finger portion of the glove; a pressure sensor coupled to the bladder and configured to sense a pressure exerted against the bladder by the physical surface; and a fluidic valve coupled to the bladder and configured to vent the bladder in response to the sensed pressure reaching a predetermined threshold.

Example 13: The artificial-reality system of Example 12, further including a cushion element positioned within or adjacent to the bladder in a location to cushion, relative to the physical surface, an intended user's finger when the glove is donned by the user.

Example 14: The artificial-reality system of Example 12 or Example 13, wherein the virtual object includes a virtual keyboard.

Example 15: The artificial-reality system of any of Examples 12 through 14, wherein the projector subsystem includes one or more of: a near-eye display; a display screen at or adjacent to the physical surface; or an optical projector.

Example 16: The artificial-reality system of any of Examples 12 through 15, further including a tracking subsystem for tracking a position of at least the glove relative to the physical surface.

Example 17: The artificial-reality system of any of Examples 12 through 16, wherein the pressure sensor comprises at least one of: a pressure sensor in fluid communication with the bladder; or a receiver electrode positioned adjacent to a first side of the bladder and at least one transmitter electrode positioned adjacent to a second, opposite side of the bladder.

Example 18: The artificial-reality system of any of Examples 12 through 17, wherein: the glove includes five fingertip portions; and the bladder includes five bladders respectively positioned in the five fingertip portions of the glove.

Example 19: A method for forming a tactile input mechanism, including: operatively coupling a pressure sensor to a bladder, wherein the pressure sensor is configured to sense a pressure exerted against the bladder; and operatively coupling a fluidic valve in fluid communication with the bladder, wherein the fluidic valve is configured to vent the bladder in response to the sensed pressure reaching a predetermined threshold.

Example 20: The method of Example 19, wherein operatively coupling the pressure sensor to the bladder includes: positioning a receiver electrode adjacent to a first side of the bladder; and positioning at least one transmitter electrode adjacent to a second, opposite side of the bladder.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A tactile input mechanism, comprising:
a bladder dimensioned to hold a fluid;
a pressure sensor coupled to the bladder and configured to sense a pressure exerted against the bladder, wherein the pressure sensor comprises:
 a receiver electrode positioned adjacent to a first side of the bladder; and
 at least one transmitter electrode positioned adjacent to a second, opposite side of the bladder, wherein the receiver electrode and the at least one transmitter electrode are positioned to move relative to each other when an internal pressure within the bladder changes; and
a fluidic valve coupled to the bladder and configured to vent the bladder in response to the sensed pressure reaching a predetermined threshold.

2. The tactile input mechanism of claim 1, wherein the pressure sensor further comprises:
a control subsystem operably coupled to the receiver electrode and to the at least one transmitter electrode, wherein the control subsystem is configured to sense the pressure exerted against the bladder by measuring a capacitance between the receiver electrode and the at least one transmitter electrode.

3. The tactile input mechanism of claim 2, wherein the at least one transmitter electrode comprises a plurality of transmitter electrodes positioned adjacent to the second, opposite side of the bladder.

4. The tactile input mechanism of claim 2, wherein at least one of the receiver electrode or the transmitter electrode is positioned at least partially within the bladder.

5. The tactile input mechanism of claim 1, further comprising a conduit coupling the fluidic valve to the bladder.

6. The tactile input mechanism of claim 1, further comprising a glove, wherein the bladder is positioned within a finger portion of the glove.

7. The tactile input mechanism of claim 6, wherein the bladder is positioned within a fingertip portion of the glove.

8. The tactile input mechanism of claim 6, wherein the bladder is positioned within the glove adjacent to a surface dimensioned to contact a side of a user's index finger when the glove is donned by the user.

9. The tactile input mechanism of claim 1, wherein the fluidic valve being configured to vent the bladder comprises the fluidic valve being configured to partially vent the bladder such that a portion of the fluid initially held by the bladder remains within the bladder after venting.

10. The tactile input mechanism of claim 1, wherein the predetermined threshold is adjustable to enable the fluidic valve to vent the bladder in response to different sensed pressures.

11. The tactile input mechanism of claim 1, wherein the fluidic valve is further configured to refill the bladder with air after venting.

12. An artificial-reality system, comprising:
a projector subsystem configured to project a virtual object on a physical surface or on an image of the physical surface;
a glove comprising at least one finger portion;
a bladder positioned within the finger portion of the glove;
a pressure sensor coupled to the bladder and configured to sense a pressure exerted against the bladder by the physical surface, wherein the pressure sensor comprises a receiver electrode positioned adjacent to a first side of the bladder and at least one transmitter electrode positioned adjacent to a second, opposite side of the bladder, wherein the receiver electrode and the at least one transmitter electrode are positioned to move relative to each other when an internal pressure within the bladder changes; and
a fluidic valve coupled to the bladder and configured to vent the bladder in response to the sensed pressure reaching a predetermined threshold.

13. The artificial-reality system of claim 12, further comprising a cushion element positioned within or adjacent to the bladder in a location to cushion, relative to the physical surface, an intended user's finger when the glove is donned by the user.

14. The artificial-reality system of claim 12, wherein the virtual object comprises a virtual keyboard.

15. The artificial-reality system of claim 12, wherein the projector subsystem comprises one or more of:
a near-eye display;
a display screen at or adjacent to the physical surface; or
an optical projector.

16. The artificial-reality system of claim 12, further comprising a tracking subsystem for tracking a position of at least the glove relative to the physical surface.

17. The artificial-reality system of claim 12, wherein the at least one transmitter electrode comprises a plurality of transmitter electrodes positioned adjacent to the second, opposite side of the bladder.

18. The artificial-reality system of claim 12, wherein:
the glove comprises five fingertip portions; and
the bladder comprises five bladders respectively positioned in the five fingertip portions of the glove.

19. A method for forming a tactile input mechanism, comprising:
operatively coupling a pressure sensor to a bladder by positioning a receiver electrode adjacent to a first side of the bladder and positioning at least one transmitter electrode adjacent to a second, opposite side of the bladder such that the receiver electrode and the at least one transmitter electrode are positioned to move relative to each other when an internal pressure within the bladder changes, wherein the pressure sensor is configured to sense a pressure exerted against the bladder; and
operatively coupling a fluidic valve in fluid communication with the bladder, wherein the fluidic valve is configured to vent the bladder in response to the sensed pressure reaching a predetermined threshold.

20. The method of claim 19, wherein:
positioning at least one transmitter electrode adjacent to a second, opposite side of the bladder comprises positioning a plurality of transmitter electrodes adjacent to the second, opposite side of the bladder.

* * * * *